Patented Aug. 7, 1951

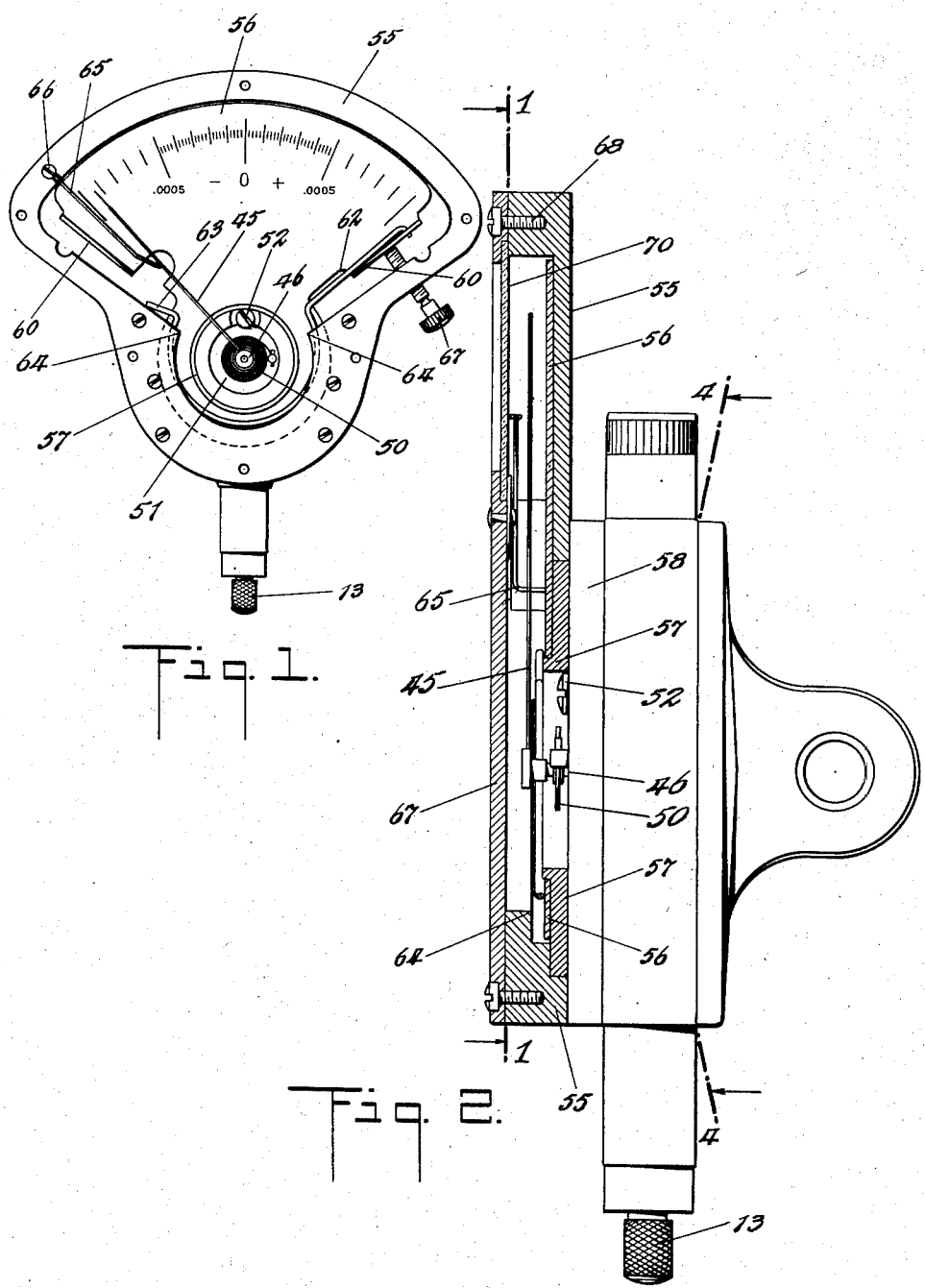

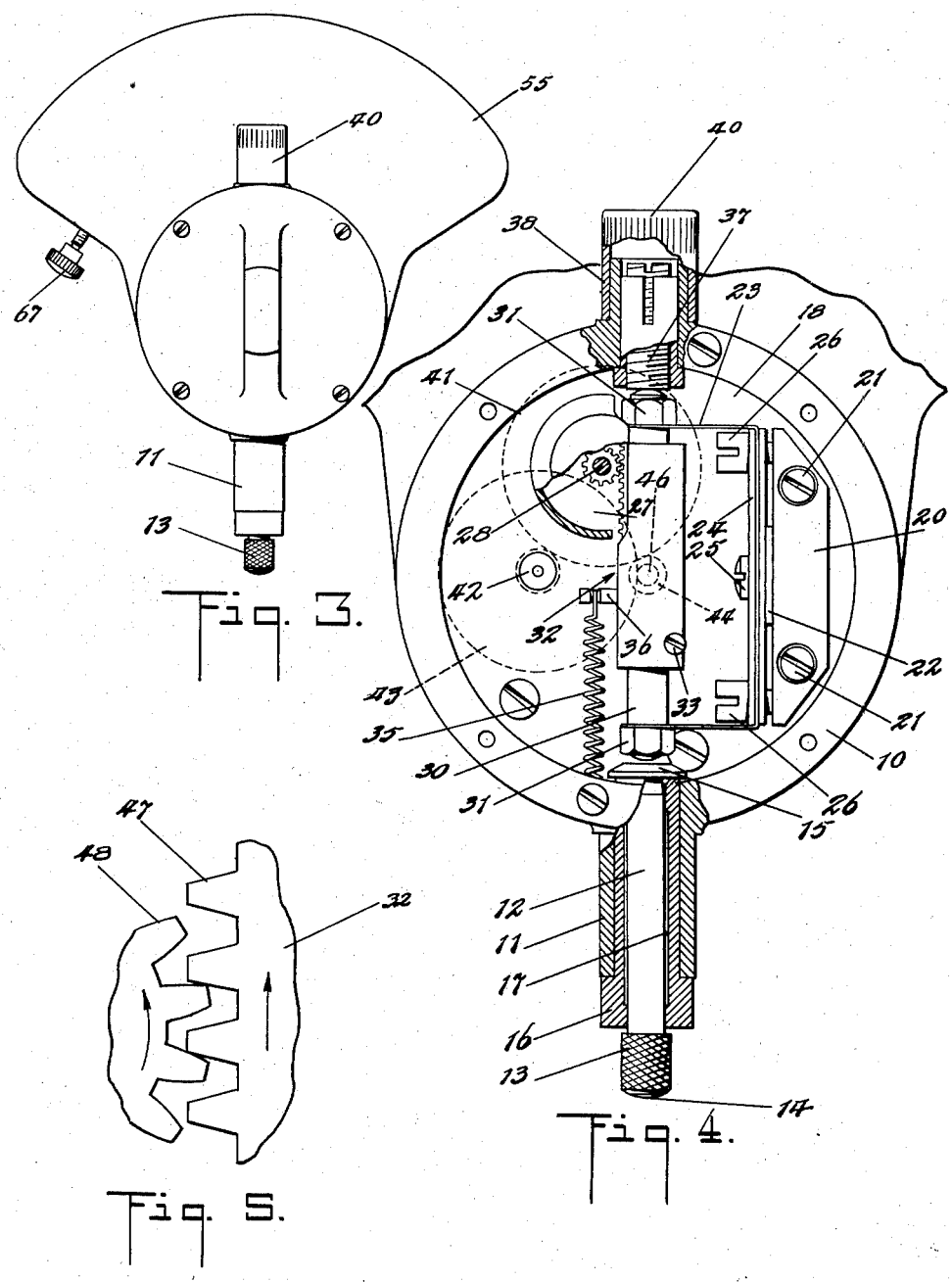

2,563,402

UNITED STATES PATENT OFFICE 2,563,402

PRECISION DIAL INDICATOR

Alfred H. Emery, Wappingers Falls, and John J. Bishop and Earl M. Boat, Poughkeepsie, N. Y., assignors to Standard Gage Company, Inc., Poughkeepsie, N. Y., a corporation of New York Application September 30, 1947, Serial No. 777,006

6 Claims. (Cl. 33—172)

1

The present invention relates to dial indicators of the type commonly used for checking linear dimensions in the various manufacturing industries. More particularly still the invention relates to a dial indicator which is shockproof in construction and which is so constructed as to give extreme precision. The present indicator is calibrated to read directly to two hundred-thousandths inch (0.00002″) and a skilled operator can readily estimate between graduations, and thus determine dimensions to at least an accuracy of one hundred-thousandth inch (0.00001″).

More particularly still, the invention comprehends a dial indicator of the type described which is entirely shockproof in construction and in which the only means which directly brings about the measuring movement of the indicator hand is a small backlash spring. Further, since the measuring plunger does not act directly upon the gear train of the instrument, side play of the measuring plunger is ineffective to cause inaccuracies in indicator reading.

It is an object of the invention to provide a dial indicator for measuring linear dimensions which is extremely accurate and capable of indicating extremely fine tolerance amounts.

It is another object of the invention to provide an instrument of the type described which will repeat readings without variation.

It is a further object of the invention to provide an instrument in which the construction is shockproof and the measuring movement of the indicator is brought about by a very light backlash spring only.

It is a still further object of the invention to provide a dial indicator as described above in which any side play which may be present in the measuring plunger will be ineffective to cause inaccuracies of the instrument.

It is another object of the invention to provide a novel means for moving the instrument dial in order to set the dial accurately at the zero point as is frequently desirable.

Other objects and features of the invention will appear when the following description is considered in connection with the appended drawings in which—

Figure 1 is a front elevation of the instrument with the cover plate and dial glass removed. This view shows particularly the construction of the dial adjusting means and the means for holding the dial in place in the instrument;

Figure 2 is a side elevation of the instrument of Figure 1 with the forward part of the instrument in section in order to show the construc-

2 tion of the dial adjusting mechanism, the backlash spring, and the means for holding the dial in place in the instrument;

Figure 3 is a rear elevation of the dial indicator of our invention;

Figure 4 is a cross-sectional view on the line 4—4 of Figure 2, showing particularly the construction of the measuring plunger and associated rack and means for adjusting the rack with respect to the pinion which cooperates therewith; and Figure 5 is a much enlarged fragmentary view of the meshing portion of the rack and pinion illustrating the manner in which the instrument is rendered shockproof.

Referring now to the drawings, and particularly to Figure 4 thereof, it will be seen that there is supplied the usual housing 10 having a depending portion 11 in which a measuring plunger 12 is mounted, the plunger 12 terminating in the tip 13 having a generally hemispherical end 14. The plunger 12 terminates at its inner end in a head 15, the upper surface of which is accurately finished and is a plane. It is to be noted that a clearance 17 is provided in the sleeve 16, in which the plunger reciprocates, in order to reduce friction.

Mounted on the gear plate 18 in which plate the various gears of the gear train are supported in the usual manner, is a block 20, the block being fastened to the gear plate by any suitable means, as for example, screws 21. The block 20 is provided with a raised section 22 at the center of its side edge and on this central section 22 is mounted the reed structure which supports the rack block. This reed structure comprises a U-shaped reed 23 the base of the U being held between two relatively stiff metal strips 24, the unit being fastened to the raised portion 22 of the block 20 by means of the screw 25. Screws 26 pass through the strips 24 and through reed 23, and are screwed into the ends of the block 20, all as is clearly shown in Figure 4. By adjustment of the screws 26, the terminal ends of the reed 23 may be moved slightly to the right or left as seen in Figure 4, and this movement serves to adjust the position of the rack 27 with respect to the cooperating rack pinion 28 as will appear.

Mounted between the arms of the U of reed 23 is a shaft or rod 30, the ends of which are threaded and pass through the reed being held by the nuts 31. The rack block 32, carrying rack 27 previously mentioned, is clamped to the rod 30 and is in effect integral therewith. The clamping is performed in a known manner, by means of a slot in the lower portion of the side of the rack block (not shown) and a screw 33 which passes through one side of the slot and is screwed into a threaded hole in the opposite side.

The usual spring 35 is stretched between the housing 10 and a pin 36 fixed in the rack block 32 this spring serving to hold the rack block and reed structure in the lowest position with the lower end of the rod 30 in contact with the upper plane surface of the head 15 of plunger 12 throughout the operating range of the indicator.

The upward movement of the rack block and reed structure is limited by the stop screw 37 which is adjustable in an upward cylindrical protrusion 38 of the housing 10. It will be understood that the upward movement of the rack block is not, strictly speaking, a linear movement, but is rather slightly arcuate. However, such a small portion of the curved path is utilized that it is for all practical purposes a linear movement, the maximum lateral movement being in the neighborhood of only 0.7%. In fact, over the useful range of the indicator the lateral movement is approximately 0.4%, amounting in a particular gage to 0.000008 inch. The entire stop screw structure is protected from dust and the like by means of the usual cap 40. It will be seen that any movement imparted to the lower end of the plunger 12 is transmitted to the reed structure and to the rack block. The rack block upon moving generally upward as described permits the rack pinion 28 to rotate in a counterclockwise direction as seen in Fig. 4, and thus transmits movement through the gear train comprising the gear 41, pinion 42, gear 43 and center pinion 44 to the indicator hand 45 which is mounted on the same shaft 46 on which the center pinion 44 is mounted.

The adjusting screws 26 previously mentioned serve to render the structure shockproof. This is accomplished in the following manner; by tightening the screws 26, the reed 23 is bent and the ends of the reed are moved toward the right, as seen in Figure 4. This in turn moves the rack block 32 to the right and provides a clearance or backlash between the teeth 47 of the rack and the teeth 48 of the pinion as shown in Figure 5. It is understood that before this adjustment is made, the rack is first positioned in close meshing relationship to the pinion 28.

The adjustment of the rack block to the right is normally an amount of approximately five thousandths inch (0.005") and this provides a tooth clearance between the teeth 47 and the teeth 48, which is slightly in excess of the total range of movement of the rack block i. e. slightly in excess of two thousandths inch (0.002") since the screw 37 is adjusted so that the maximum movement of the rack block is less than 0.002 inch. Thus for any sudden maximum advance of the rack block 32 the leading face of any rack tooth 47 cannot strike the next adjacent face of a pinion tooth 48, and no matter how heavy a blow is struck upon the plunger 12 it cannot be imparted to the rack pinion 28.

Rather, the pinion 28 is constantly urging rack block 32 upwardly, this urge being supplied by the light backlash spring 50, see Figure 1, which is mounted on the forward plate of the instrument and is adjustable by means of the annular anchor plate 51 and screw 52, the urge of the backlash spring being transmitted from the shaft 46 through the gear train above described to the pinion 28.

It will thus be seen that the instrument which we have provided is extremely accurate for a number of reasons; firstly, the utilization of the mounting reed 23 provides a substantially linear movement of the rack block 32 and eliminates sliding parts which tend to introduce errors due to side play; secondly, the contact point 15 and plunger 12 transmit movement of the rod 30 and rack block 32 by direct push only, and although the member 12 is slidably supported in the sleeve 16 any side play which is present has no effect upon the longitudinal movement of the rack block 32; thirdly, the use of the backlash spring 50, one end of which is fixed directly to the shaft 46 eliminates the commonly used backlash gear and thus reduces the mass and inertia of the parts thereby contributing to accuracy of reading. Also contributing to the instruments accuracy is the utilization of a pointer 45 of extremely light construction, this pointer being formed from aluminum tubing having a diameter of one hundredth inch (0.01") and a wall thickness of two thousandths inch (0.002").

As explained, the utilization of the reed mounting described renders the rack teeth 47 adjustable in position with respect to the cooperating pinion teeth 48 and permits of a construction which is shockproof.

In order that the indicator of our present invention may have a dial sufficiently spread out so as to be readily read, we have provided a forward portion of the housing which is of a fan like shape and which is designated 55, see Figures 1 and 2. Within a depression in the housing 55, there is mounted the graduated scale 56 this scale being rotatably mounted upon a hub 57 which is held between a shoulder on the housing 55 and the forward gear plate 58.

The dial 56 is generally arcuate in shape as stated, and is provided with a bent up lug 60 at either end thereof. A screw 61 is threaded through a hole in the side of housing 55 and bears against one of the bent up lugs and thus, the dial may be rotated through a limited arc about the hub 57 as the center.

Bearing against the opposite side of the lug 60 is a spring 62 which extends around the hub 57 at the lower portion and the opposite end 63 of which bears against housing 55. Thus spring 62 tends to rotate the dial clockwise as seen in Figure 1 and to keep it against the end of the screw 61. The spring 62 passing as it does under the corners 64 of the housing member 55 not only urges the dial in a clockwise direction, but likewise holds the dial plate in position on the hub 57.

Due to the fact that in some situations in which the gage may be used, the screw 60 would be in the way and would make the use of the gage inconvenient, we have provided a similar tapped hole in the opposite or left hand side of the casing. Thus by removing the spring 62 and reversing it, and by removing the screw 61, and inserting it in the hole just mentioned the dial may be adjusted from the opposite side.

A stop member 65 is provided to limit the movement of the hand or pointer 45 when returning to its normal rest position. This stop member comprises a resilient wire which is fixed to the rim of the casing or housing member 55, by means of the screws 66 and which extends radially inward, and lies in the path of the pointer 45.

A cover plate 67 is provided for the housing 55, this cover plate being fixed to the housing in any suitable manner, as, for example, by means of screws 68. The housing plate is provided in the normal manner with a transparent window 70 through which the scale or dial 56 and the cooperating pointer 45 may be seen.

In view of the many changes and modifications that may be made without departing from the principles underlying this invention, reference should be made to the appended claims for an understanding of the scope of the protection afforded the invention.

What is claimed is:

1. In a precision dial indicator of the class described having a housing, a gear train therein, a measuring plunger mounted in said housing for reciprocating movement and a rack for transmitting movement from the measuring plunger to the gear train, the improvement which comprises, in combination, a U-shaped reed upon the arms of which the rack is mounted, said reed being supported in position to cause said rack to be in mesh with one of the gears of the gear train, said measuring plunger terminating adjacent one end of the rack in position to transmit movement from said plunger to said rack to thereby operate said gear train, and means for bending the base of the U of said reed to thereby move said rack transversely of its axis, to adjust the clearance between the teeth of said rack and the meshing gear to thereby render the clearance between said teeth greater than the total range of movement of said measuring plunger and prevent transmission of an impact blow against said measuring plunger to the gear train.

2. In a precision dial indicator of the class described having a housing, a gear train therein, a measuring plunger mounted in said housing for reciprocating movement and a rack for transmitting movement from the measuring plunger to the gear train, the improvement which comprises, in combination, a U-shaped spring reed upon the extending arms of which the rack is mounted, said reed being fixed in position relative to the housing with said rack in mesh with one of the gears of the gear train, terminating said measuring plunger adjacent one end of the rack in position to transmit axial movement of said plunger to said rack to thereby operate said gear train, and means for bending the base of said U shaped reed to thereby move said rack transversely of its axis, to adjust the clearance between the teeth of said rack and the meshing gear to thereby render the clearance between said teeth greater than the total range of movement of said measuring plunger and prevent transmission of an impact blow against said measuring plunger to the gear train.

3. In a precision dial indicator of the class described, in combination, a housing, a measuring plunger mounted in said housing for reciprocating movement, a gear train supported within said housing, a rack for transmitting movement from said measuring plunger to said gear train, and means for mounting said rack, said means comprising a U shaped reed, the base of said U being fixed relatively to said housing and said rack being mounted between the terminal ends of the arms of said U said mounting means providing for movement of the rack block, one component of which is throughout the range of the instrument equal to and in the same direction as the movement of the measuring plunger.

4. In a precision dial indicator of the class described, in combination, a housing, a gear train mounted therein, a backlash spring urging said gears of said gear train in one direction, a measuring plunger mounted in said housing for reciprocating movement, said measuring plunger terminating in a plane surface immediately adjacent the interior of said housing, a reed having a base portion and parallel arm portions, and mounted in fixed position relative to said housing, a rack mounted upon the arms of said reed for substantially longitudinal movement under urge of said measuring plunger, said rack engaging one of the gears of said gear train and being urged in the measuring direction by said backlash spring, and means for urging said rack and said measuring plunger in the opposite direction, the urge supplied by said last mentioned means being greater than that supplied by said backlash spring.

5. In a precision dial indicator of the class described, in combination, a housing, a gear train mounted in said housing, a measuring plunger mounted in an extension of said housing and adapted to make contact with the work to be measured, said measuring plunger being capable of reciprocation along a line forming an extension of a diameter of said housing, a rack block, a U shaped resilient reed carrying said rack block between its arms for movement substantially along the said diametrical line, means supporting said reed, said means comprising a block mounted in fixed position relative to said housing, said block having a boss on the central portion of one of its sides, said reed being fastened to said boss, and means for varying the position of said rack block transversely of said diametrical line, said means comprising screws extending through said reed adjacent the ends of the base thereof, and being screwed into said block to thereby bend the base of said reed.

6. In a precision dial indicator of the class described, in combination, a housing, a gear train mounted in said housing, a measuring plunger mounted in an extension of said housing and adapted to make contact with the work to be measured, said measuring plunger being capable of reciprocation along a line forming an extension of a diameter of said housing, a rack block, a U shaped resilient reed carrying said rack block between its arms for movement substantially along the said diametrical line, and means supporting said reed, said means comprising a block mounted in fixed position relative to said housing, said block having a boss on the central portion of one of its sides, said reed having a relatively stiff clamping strip on each side of its base, means fastening said clamping strips and said reed to said base, said fastening means extending through said clamping strips and said reed adjacent the ends of the base thereof, and being screwed into said block to thereby bend the base of said reed.

ALFRED H. EMERY.
JOHN J. BISHOP.
EARL M. BOAT.

REFERENCES CITED

The following references are of record in the file of this patent:

UNITED STATES PATENTS

| Number | Name | Date |
|---|---|---|
| 2,019,132 | Hansen | Oct. 29, 1935 |
| 2,074,279 | Sisson | Mar. 16, 1937 |
| 2,117,267 | Ames | May 17, 1938 |
| 2,117,268 | Ames | May 17, 1938 |
| 2,237,653 | Chatillon | Apr. 8, 1941 |